United States Patent
Jeeves et al.

(10) Patent No.: US 10,851,621 B2
(45) Date of Patent: Dec. 1, 2020

(54) INSTRUMENTATION SYSTEM FOR DETERMINING RISK FACTORS

(75) Inventors: Simon Jeeves, Eidsvågs (NO); Tore Juvik, Eidsvågs (NO)

(73) Assignee: MRC Solberg & Andersen AS, Nyborg (NO)

( * ) Notice: Subject to any disclaimer, the term of this patent is extended or adjusted under 35 U.S.C. 154(b) by 0 days.

(21) Appl. No.: 13/066,091

(22) Filed: Apr. 6, 2011

(65) Prior Publication Data

US 2012/0259559 A1    Oct. 11, 2012

(51) Int. Cl.
| | |
|---|---|
| *E21B 41/00* | (2006.01) |
| *E21B 34/16* | (2006.01) |
| *F16K 37/00* | (2006.01) |
| *E21B 34/02* | (2006.01) |
| *E21B 34/04* | (2006.01) |
| *G07C 3/00* | (2006.01) |

(52) U.S. Cl.
CPC .......... *E21B 41/0007* (2013.01); *E21B 34/02* (2013.01); *E21B 34/04* (2013.01); *E21B 34/16* (2013.01); *F16K 37/0083* (2013.01); *F16K 37/0091* (2013.01); *G07C 3/00* (2013.01)

(58) Field of Classification Search
CPC .................................................. E21B 41/0007
USPC ...... 702/51, 182; 417/9, 23, 110; 73/46, 168
See application file for complete search history.

(56) References Cited

U.S. PATENT DOCUMENTS

| | | | |
|---|---|---|---|
| 3,865,142 A | 2/1975 | Begun | |
| 3,875,995 A * | 4/1975 | Mannion et al. | 165/218 |
| 4,879,901 A * | 11/1989 | Leon | 73/168 |
| 5,220,940 A * | 6/1993 | Palmer | B08B 15/023 |
| | | | 137/487.5 |
| 5,396,167 A * | 3/1995 | Leon | F16K 37/0083 |
| | | | 324/73.1 |
| 5,549,137 A * | 8/1996 | Lenz et al. | 137/486 |
| 6,128,946 A * | 10/2000 | Leon | F16K 5/0663 |
| | | | 73/40.5 A |
| 6,134,949 A * | 10/2000 | Leon et al. | 73/40.5 A |
| 6,976,503 B2 * | 12/2005 | Ens et al. | 137/552 |
| 2006/0185418 A1* | 8/2006 | Hoffman | G05B 23/0256 |
| | | | 73/1.72 |

(Continued)

FOREIGN PATENT DOCUMENTS

| | | | | |
|---|---|---|---|---|
| EP | 1070573 A1 * | 1/2001 | .......... | E21B 30/035 |
| EP | 1393136 A1 * | 3/2004 | .............. | G01D 3/08 |

OTHER PUBLICATIONS

Juvik et al., "Online Valve Monitoring Systems used on Off-shore platforms in the North Sea," Proceedings of OMAE 2002.*

*Primary Examiner* — Hyun D Park
(74) *Attorney, Agent, or Firm* — Kramer Levin Naftalis & Frankel LLP (57) ABSTRACT

An instrumentation system for monitoring one or more valves of an assembly includes one or more sensors coupled to the one or more valves, and a data processing arrangement for processing sensor signals generated by the one or more sensors to provide an indication of operation of said one or more valves. The one or more sensors and the data processing arrangement are operable to compute one or more risk factors {R} from the sensor signals indicative of operating reliability and/or safety of the one or more valves. The instrumentation system is, for example, suitable for use with valves of the X-mas tree (Christmas tree) assembly for oil and gas production, for example in a sub-sea environment.

10 Claims, 4 Drawing Sheets

(56) References Cited

U.S. PATENT DOCUMENTS

2007/0068225 A1\* 3/2007 Brown ................ F16K 37/0075
73/40.5 A
2009/0222220 A1\* 9/2009 Wilke ................. F16K 37/0091
702/34
2009/0322544 A1\* 12/2009 McDowell ................ F17D 5/06
340/605

\* cited by examiner

INSTRUMENTATION SYSTEM FOR DETERMINING RISK FACTORS

TECHNICAL FIELD OF INVENTION

The present invention relates to instrumentation systems for determining risk factors, for example to instrumentation systems for determining risk factors associated with apparatus including one or more valves, for example "X-mas tree" (Christmas tree) apparatus including master valves employed to cap oil and gas bore holes. Moreover, the present invention relates to methods of employing instrumentation systems for determining risk factor, for methods of employing instrumentation systems for determining risk factors associated with apparatus including one or more valves, for example "X-mas tree" (Christmas tree) apparatus including master valves employed to cap oil and gas bore holes. Furthermore, the invention also relates to software products executable on computing hardware for implementing aforementioned methods. The apparatus is optionally concerned with oil and/or gas production, although the apparatus is susceptible to being employed in other applications not related to oil and/or gas discovery and/or production.

BACKGROUND TO THE INVENTION

In many contemporary installations, for example oil and/or gas production facilities, in nuclear reactors, in chemicals processing plants, there are critical components whose failure potentially results in devastating consequences. A major oil disaster in the Gulf of Mexico in the year 2010 ("Deep Water Horizon") is an example of potential damage which occurs when critical components fail. Moreover, later problems at atomic reactors at Fukushima, Japan in the year 2011 illustrate an importance that critical safety systems are able to function when required in an emergency, namely to provide interim cooling to atomic reactors which have been shut down but have not yet cooled down. In all of these installations, there are fluid flows which are controlled via control valves, for example via so-called "butterfly valves", pin-and-seat valves and so forth.

When operating installations whose failure could unleash colossal damage, operators are obliged to seek insurance to address damage costs in an event of a major accident occurring. Companies such as Veritas AS specialize in providing insurance for major technical projects, for example for off-shore oil and/or gas installations, for civil engineering products such as bridge construction, as well as shipping and off-shore wind turbines. Often, a grant of insurance requires operators of installations to have taken adequate measures to reduce a risk of a potential accident from arising. Such adequate measures includes, for example, selection of suitable components and materials, inclusion of safety backup systems for coping in an event of an emergency arising, and monitoring systems for monitoring physical conditions within an installation.

A problem arising in practice with complex installations is that it is often difficult to determine an instantaneous risk factor which is potentially temporally dynamically varying depending on operating status of the installations. Determination of the risk factor, namely an indication of probability of failure of the installations, is often devolved to experienced personnel, for example engineers, who have personal experience with technologies employed within the installations.

In a United States granted U.S. Pat. No. 3,865,142 ("Electrical remote control system for underwater wells", Begun et al., FMC Corp., California, USA), there is described a fail-safe electrical system for controlling, from a remote location, operation of hydraulic, pneumatic and/or electrically powered mechanisms, for measuring pressures, temperatures and any other parameter transduceable to an electrical parameter and indicative of corresponding values thereof on a display panel at the remote location. As employed with valves and pressures at an underwater oil, gas, or other fuel well, the system comprises a control station at a suitable surface location, an underwater or sub-sea station adjacent to the well, a single electrical cable interconnecting the two stations, and additional single electrical cables from the sub-sea station to each of the valves to be operated and to each of the pressure locations to be monitored. Where valves, chokes, or other elements of the well are hydraulically or pneumatically powered, the system employs solenoid valves beneficially positioned in the sub-sea station to control the hydraulic or pneumatic pressures delivered to the elements. Where the valves are electrically powered, they are controlled by suitable relays in their electric circuit. A specific system for controlling operation of nine valves and for monitoring five pressures at a well's "X-mas tree" assembly (Christmas tree) is described, as also is a system for implementing procedures on a plurality of wells from a single control station.

SUMMARY OF THE INVENTION

The present invention seeks to provide an instrumentation system for determining one or more risk factors pertaining to an assembly including one or more valves provided with one or more sensors for sensing operation of the one or more valves.

Moreover, the present invention seeks to provide a method of determining one or more risk factors pertaining to the aforesaid assembly.

According to a first aspect of the invention, there is provided an instrumentation system as claimed in appended claim 1: there is provided an instrumentation system for monitoring one or more valves of an assembly, wherein the system includes one or more sensors coupled to the one or more valves, and a data processing arrangement for processing sensor signals generated by the one or more sensors to provide an indication of operation of the one or more valves, characterized in that the one or more sensors and the data processing arrangement are operable to compute one or more risk factors (R) from the sensor signals indicative of operating reliability and/or safety of the one or more valves.

The invention is of advantage in that computation of the one or more risk factors (R) enables more reliable and/or safer operation of the one or more valves to be achieved in operation.

Optionally, the instrumentation system is adapted for monitoring the one or more valves incorporated into an oil and/or gas production assembly. More optionally, the oil and/or gas production assembly and the system are adapted for sub-sea operation.

Optionally, the instrumentation system is implemented such that each valve includes a corresponding adjustable flow controlling element, an actuator arrangement for actuating the flow controlling element, and the one or more sensors are operable to sense:

(a) a dynamic pressure difference across the element;
(b) a cavity pressure indicative of leakage of one or more seals of the element;
(c) a torque generated by the actuator arrangement when actuating the element; and
(d) a pressure of actuating fluid supplied to the actuator arrangement.

Optionally, the instrumentation system is implemented such that the one or more sensors and a communication arrangement coupling the one or more sensors to the data processing arrangement are arranged to be constructed to an intrinsically safe standard.

Optionally, the instrumentation system is implemented such that the data processing arrangement is operable to compute the one or more risk factors (R) taking into account at least flow characteristics of a flow of fluid through the one or more valves as sensed by the one or more sensors.

According to a second aspect of the invention, there is provided a method of employing an instrumentation system for monitoring one or more valves of an assembly, characterized in that the method includes:
(a) including one or more sensors coupled to the one or more valves, and a data processing arrangement for processing sensor signals generated by the one or more sensors; and
(b) using the data processing arrangement for processing sensor signals generated in operation by the one or more sensors to compute one or more risk factors (R) from the sensor signals indicative of operating reliability and/or safety of the one or more valves.

Optionally, the method further includes:
(c) sensing using the one or more sensors in respect of each valve for a corresponding adjustable flow controlling element, and an actuator arrangement for actuating the flow controlling element, following parameters:
  (i) a dynamic pressure difference across the element;
  (ii) a cavity pressure indicative of leakage of one or more seals of the element;
  (iii) a torque generated by the actuator arrangement when actuating the element; and
  (iv) a pressure of actuating fluid supplied to the actuator arrangement.

According to a third aspect of the invention, there is provided a software product recorded on machine-readable data storage media, characterized in that the software product is executable on computing hardware for implementing a method pursuant to the second aspect of the invention.

According to a fourth aspect of the invention, there is provided an assembly including one or more valves for controlling fluid flow within the assembly, characterized in that the assembly includes an instrumentation system pursuant to the first aspect of the invention.

Features of the invention are susceptible to being combined in various combinations without departing from the scope of the invention as defined by the claims.

DESCRIPTION OF THE DIAGRAMS

Embodiments of the invention will now be described, by way of example only, with reference to the following diagrams wherein.

DESCRIPTION OF EMBODIMENTS OF THE INVENTION

Assemblies including one or more valves are contemporarily employed in various installations which are safety critical, namely where valve failure may potentially have serious consequences. The one or more valves are provided with one or more corresponding actuators, and are operable to provide a controllable degree of resistance to fluid flow therethrough, for example in closed, open or partially-open states. Pursuant to the present invention, information indicative of a condition of the one or more valves and their one or more actuators is beneficially derived both from a finally actuated state thereof and also from their characteristics whilst they are being actuated. In an example complex installation indicated generally by 10 in FIG. 1, there are a plurality of valves 20, wherein failure of merely one of the valves 20 is potentially susceptible to cause serious operating problems. In a central control room 30 of the complex installation 10, to assist to avoid a potential information overload of operators 40, a computer system 50 of the control room 30 is operable to aggregate data received at the control room 30 in order to present to the operators 40 an overall indication of a real-time state of the installation 10. The operators 40 often do not have time to monitor operation of each individual valve 20 of the installation 10 in detail, for example to observe each every nuance of valve 20 operation. If the aggregation is not executed in a flexible and transparent manner, a risk potentially arises as occurred at the Harrisburg "Three Mile Island" nuclear disaster, wherein the operators 40 are blocked by the layers of software from appreciating what is really happening in respect of individual valves 20 which may have a critical function within the installation 10.

Figure 1:
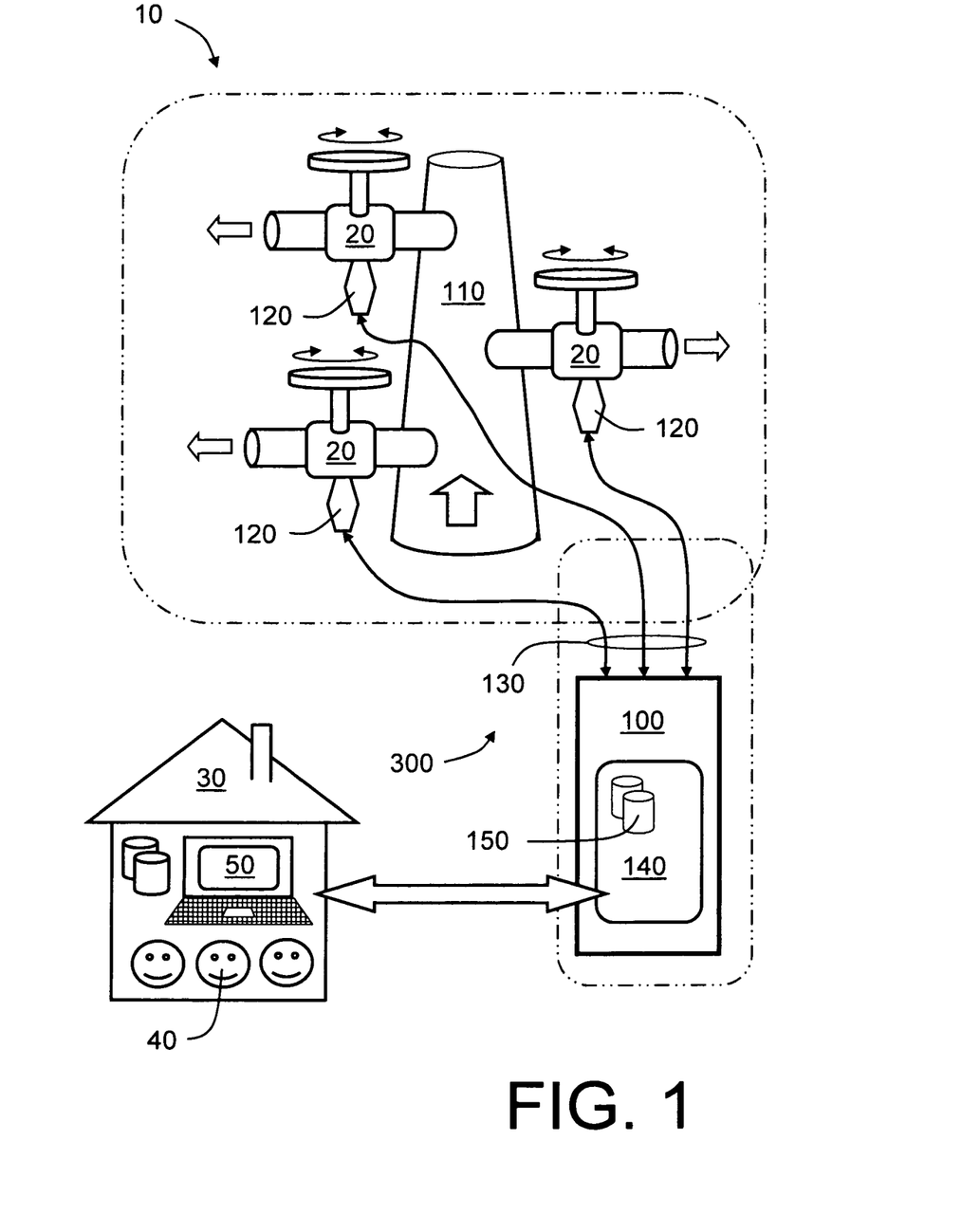
FIG. 1 is an illustration of a complex installation including one or more valves whose reliable operation is critical to the installation.

The installation 10 is, for example, an oil and/or gas production installation, a nuclear power station, a chemical manufacturing facility, a water works, a hydroelectric power facility, a wind turbine array, although the present invention is also applicable to other types of complex installation. Although the one or more valves 20 are mentioned in the foregoing, the invention is optionally also pertinent to other types of actuated assemblies, for example nuclear fuel rod handling equipment. Optionally, for example, the one or more valves 20 are associated with a "X-mas tree" (Christmas tree) assembly often employed in sub-sea locations to cap casing pipes leading to subterranean oil and/gas reservoirs, for example defined within geological anticlines. An example of a "X-mas tree" (Christmas tree) assembly is described in the aforementioned patent no. U.S. Pat. No. 3,865,142 which is hereby incorporated by reference. The present invention is concerned with an instrumentation system 100 for determining risk factors associated with configurations of the one or more valves 20, for example as illustrated in FIG. 1. The one or more valves 20 are associated with an assembly 110, for example a sub-sea "X-mas tree" assembly. The instrumentation system 100 includes one or more sensors 120 for measuring at the assembly 110 one or more physical parameters, for example a static pressure (i.e. "DC pressure"), a temporal variation in pressure (i.e. "AC difference"), a temperature, a flow rate, a relative position of a component or element and so forth. The instrumentation system 100 further includes a communication arrangement 130 for communicating signals generated by the one or more sensors 120 to a data processing arrangement 140. The data processing arrangement 140 is optionally remote from the assembly 110. Alternatively, the data processing arrangement 140 is optionally spatially local to the assembly 110. Yet alternatively, the data processing arrangement 140 is implemented at several spatial locations, for example partially local to the assembly 110, and partially spatially remote therefrom.

The data processing arrangement 140 is arranged to execute one or more software products 150 which are operable to receive sensed information regarding movement of one or more valve 20 of the assembly 110 and/or one or more actuators thereof, for example movement of valve 20 components, changes in pressure, changes in pressure variations, fluid flow rates and so forth. The sensed information is generated by the one or more sensors 120 associated with the one or more valve 20 and/or their corresponding one or more actuators. The one or more software products 150 are operable to process the sensed information according to a set of rules, which in conglomerate define a method, from which one or more risk factors are calculated. The one or more risk factors are beneficially, for example, brought to the attention of one or more operators 40 in a situation where the one or more computed risk factors exceed one or more corresponding threshold values or levels. Optionally, the one or more threshold values or levels are dynamically changed in response to a type of mode of operation of the valves 20, for example when required to control of flow of different types of fluid on different occasions with mutually different degrees of hazard associated therewith. Optionally, the one or more threshold values are defined by insurance organizations, for example Veritas AS. Optionally, the one or more threshold values or levels are dynamically changed to account for corrosion and/or ageing characteristics of the one or more valves 20 being monitored by the one or more software products; for example an old worn out and/or corroded valve 20 is more likely to fail than a newly installed pristine quality-certified valve 20. Optionally, the aforesaid set of rules are part of a parametric model of the one or more valves 20 wherein sensed signals from the one or more valves 20 and/or their one or more actuators are input parameters to the parametric model, the outputs from the parametric model are employed to compute one or more risk factors which are compared against one or more threshold levels or values for providing various degrees of risk operating warnings from the one or more software products 150 to the operators 40. Optionally, the parametric model is arranged to change dynamically in response to input signals provided thereto, for example for modeling valve abrasion, corrosion and ageing.

Applicant (Solberg & Andersen AS) is a manufacturer of monitoring systems for valves, for example a proprietary ValveWatch™ system. The ValveWatch™ system is operable to perform leak and condition monitoring of critical ON/OFF valves, for example ESD/ESV-type valves. The ValveWatch™ system is beneficially employed for implementing embodiments of the present invention.

Figure 2:
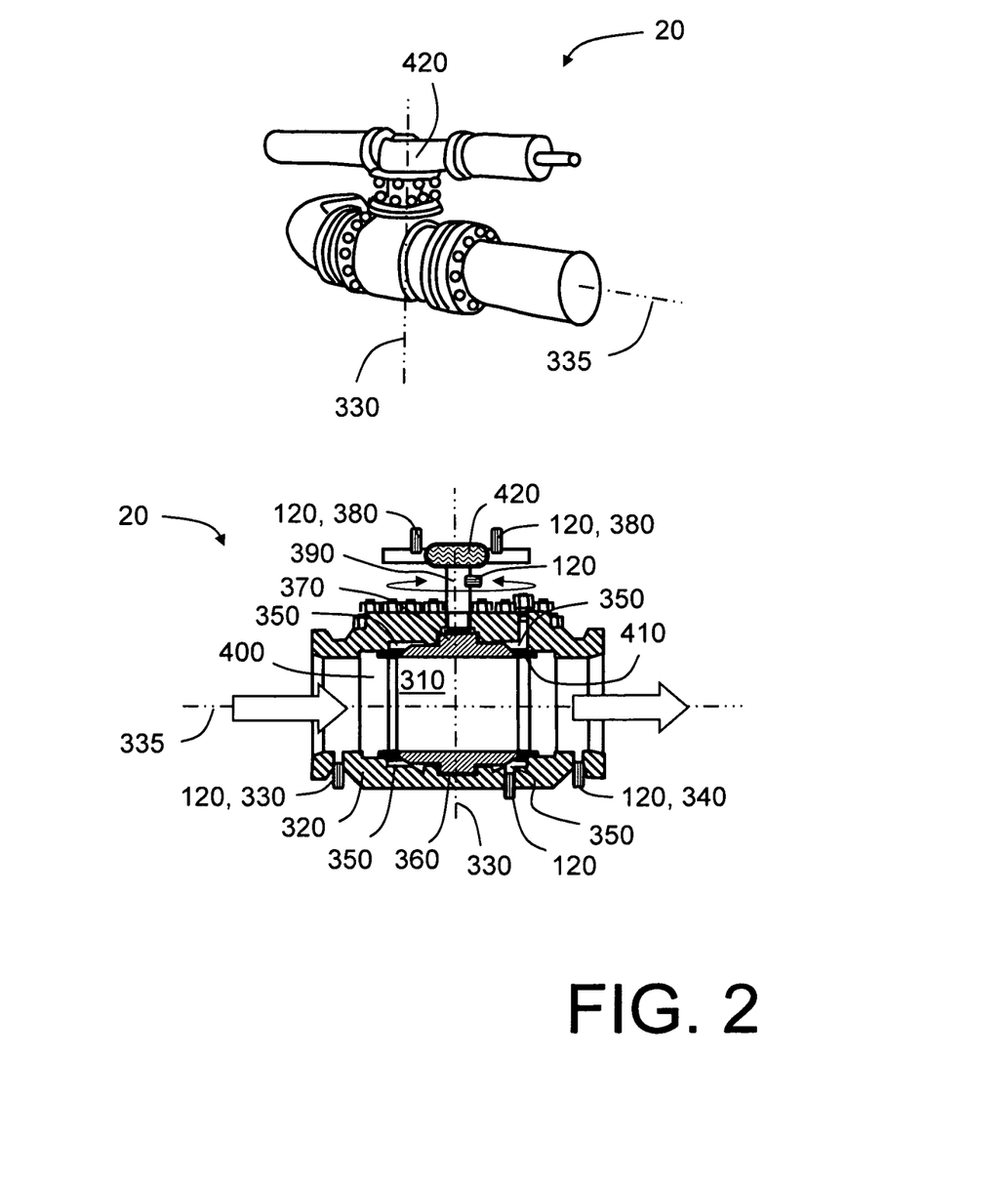
FIG. 2 is an illustration of an instrumentation system pursuant to the present invention.
Figure 3:
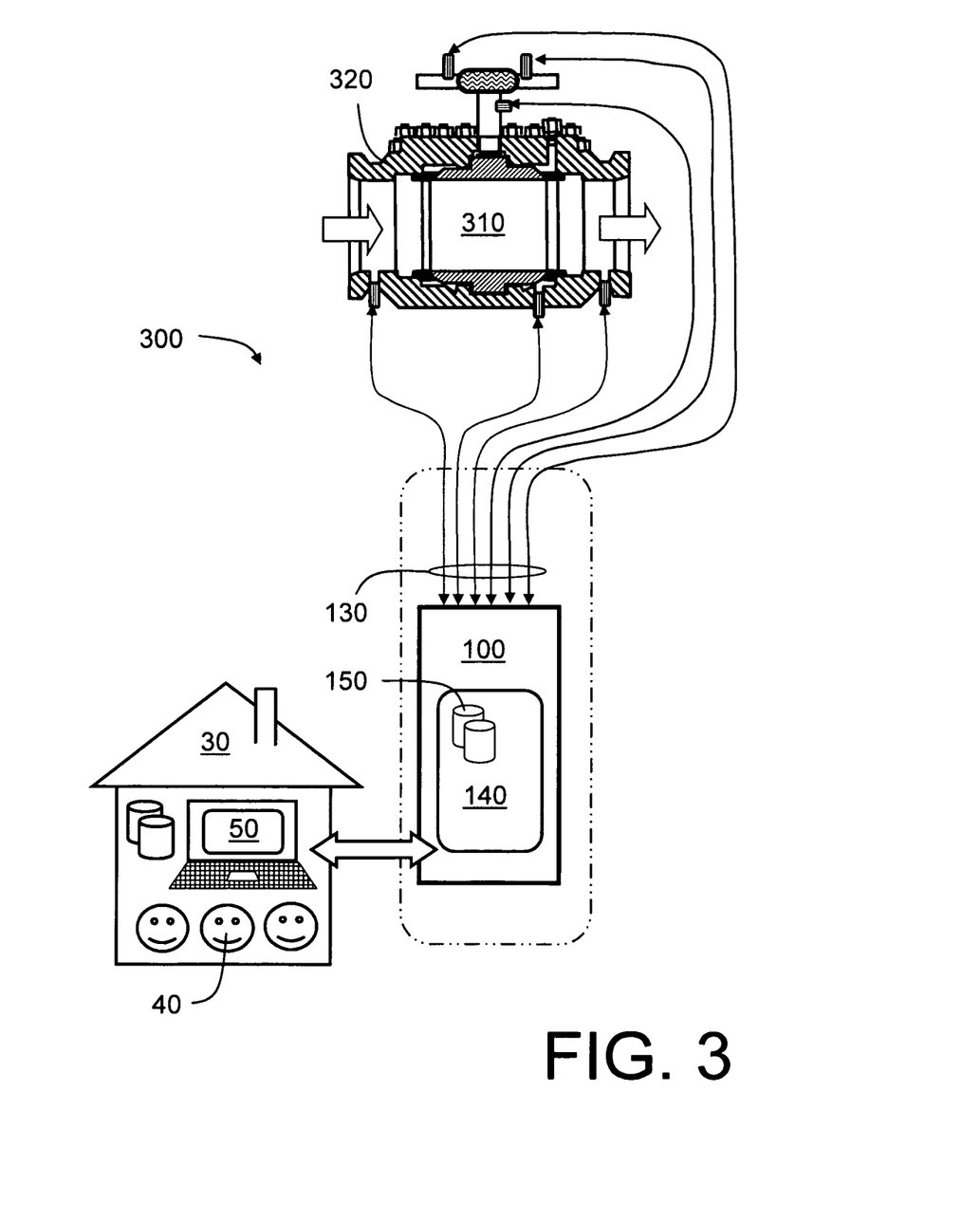
FIG. 3 is an illustration of a contemporary ValveWatch system adapted pursuant to the present invention.

An example of use of the ValveWatch system 300 is illustrated in FIG. 2 and FIG. 3, namely suitable for use with the aforementioned valve 20. In an example, the valve 20 includes a rotatable element 310 mounted within a tube component 320. Rotation of the element 310 about an axis 330, which is orthogonal to an elongate axis 335 of the tube component 320, is operable to control a flow of a fluid along the tube component 320. Upstream and downstream of the element 310, there are included two dynamic pressure sensors 330, 340 mounted into holes provided on the tube component 320 as illustrated; the dynamic pressure sensors 330, 340 are operable to provide signals representative of temporal pressure variations, namely "AC coupled" pressure measurement signal. Moreover, the tube component 320 includes a cavity 350 around upper and lower regions whereat the element 310 is rotatable mounted about pivot points 360, 370. The cavity 350 is provided with a pressure sensor 380 as illustrated. Optionally, the tube component 320 is also provided with a strain gauge sensor mounted onto an outer circumferential surface of a yoke 390; the yoke 390 is operable to convey torsional force required for rotating the element 310 for opening or closing the valve 20. For substantially sealing the cavity 350 in respect of an inner region 400 of the tube component 320, the element 310 is provided with an annular seal 410. In operation, the element 310 is rotated by a rotary actuator 420 coupled via the yoke 390 to the element 310 as illustrated. The yoke 390 is conveniently implemented as a shaft having a substantially circular cross-section. Optionally, the actuator 420 is provided with two static pressure sensors 380 for measuring a pressure of actuating fluid supplied to the actuator 420; in other words, the two static pressure sensors 380 are operable to measure static constant pressures, namely "DC coupled" pressure signals. The dynamic pressure sensors 330, 340 are employed to monitor any increase in leakage through the valve 20; moreover, the static pressure sensors 380 of the actuator 420, and the strain gauge mounted to the yoke 390 are employed to monitor an overall operating condition of the valve 20; for example, damage or corrosion to the element 310 or any component parts to which it abuts is potentially sensed by an increase in actuator fluid pressure and/or torque at the yoke 390 necessary to change a state of the valve 20, for example when being actuated between open and closed states. The strain gauge mounted to the yoke 390 is beneficially implemented in a full Wheatstone bridge configuration, such that the strain gauge not only measures torque, but also strain in at least two Cartesian directions, for example in mutually orthogonal X and Y directions; in other words, the strain sensor is beneficially operable to measure torque, thrust, sheering and torsional forces in respect of the yoke 390.

For purposes of detecting leakage through the valve 20, two principal types of sensor technology are susceptible to being employed: dynamic pressure sensors, acoustic sensors. Beneficially, both types of technology are employed for implementing the present invention. The types of technology include piezo-electric pressure sensors for example.

Thus, in overview, the system 300, for example implemented in a context of a proprietary "ValveWatch™ system", incorporates sensors attached onto the valve 20 and to the actuator 420 to monitor and record their performance in a routine manner. Optionally, the system 300 is operable to operate the valve 20 periodically to characterize its operating performance. The strain sensor and the actuator pressure sensors monitor a performance of the valve 20 and its actuator 420 during operation; dynamic pressure sensors and acoustic sensors monitor the valve 20 for internal seal seat leaks, for potential leaks and for potential snagging or binding. In synergistic combination, these aforementioned sensors provide, via the data processing arrangement 140, the operators 40 with an automated checkup on a real-time condition of the valve 20 and its associated actuator 420, for example by providing one or more computed risk factors pertaining to the valve 20, wherein the risk factors are indicative of likely probability of operating failure or complications which are likely to arise in respect of the valve 20. The one or more computed risk factors have an advantage in that they can be rapidly appreciated by the operators 40 and their significance rapidly assessed. Optionally, the one or more risk factors can be used to trigger automatically emergency safety procedures and/or maintenance procedures.

The strain gauge sensor and the actuator pressure sensors provide valuable diagnostic data each time the valve 20 strokes, namely changes between its open and closed states wherein the element 310 is rotated by action of the actuator 420. The strain gauge sensor is permanently bonded to the yoke 390 and is used for monitoring at least a torque applied to the element 310 during a stroke of the valve 20. Technical problems with operation of the valve 20, including damage to certain components thereof, are readily detectable from signals generated by the strain gauge sensor.

The pressure sensors 380 mounted to supply lines to the actuator 420 assist to enable recording in changes in actuator 420 pressure through a stroke of the valve 20. Damage to the actuator 420 or a problem with air or hydraulic supply to the actuator 420 is susceptible to being detected using these pressure sensors 380. The pressures sensors 380 mounted to the actuator 420 are also used to monitor when the element 310 of the valve 20 changes position, for example by way of detecting a momentary reduction in hydraulic fluid pressure as the actuator 420 executes its stroke; beneficially, the system 300 is optionally operable to implement a valve stroke test in an event of a problem being identified, for further valve 20 characterization tests.

The data processing arrangement 140 optionally includes a local data acquisition unit (LDAU) assembly which includes a proprietary IP66 weather-proof box housing, and a plurality of modules installed spatially as closely as practically feasible to the valve 20. The modules optionally include two strain/AC modules and a communications module. The communication module is operable to support communication via strain channels for use in monitoring signals from the strain gauge associated with the yoke 390 and from the static pressure sensors 380 associated with the actuator 420. Moreover, the communication module is operable to provide AC channels for handling signals generated by the dynamic pressure sensors 330, 340. The data processing arrangement 140 is operable to condition and to convert signals received from the sensors 120, 330, 340, 380 to a digital format for subsequent communication via the communication module for wireless or data-over-power transmission to a HUB assembly. The LDAU assembly and the sensors 120, 330, 340, 380 are beneficially implemented in an intrinsically safe manner so that their operation is not capable of initiating any form of fire or explosion at the valve 20, even in an event of a leakage of flammable fluids externally from the valve 20; beneficially, the LDAU assembly and the sensors are certified according to North American and European standards for installation in Zone 0 areas.

Beneficially, additional communications apparatus and an Ethernet module are included in the HUB assembly together with all power supplies, terminal strips and intrinsic safety barriers. Beneficially, the HUB assembly is rack-mounted in a safe area with Zone 2 designation or equivalent room. Optionally, each HUB assembly is susceptible to being configured to monitor up to eight valves 20. Conveniently, an Ethernet cable connects the HUB assembly to a sever whereat sensor data is stored, transmitted and then analyzed for leakage, for example in connection with computing one or more risk factors. Optionally, all test results from the one or more valves 20 are stored in a secure Oracle database application support by the data processing arrangement 140.

Beneficially, for remote monitoring of risk factors and operation of valves 20, the system 300 includes a simple Internet web interface for allowing easy access to the system 300 for monitoring its status from any location wherein Internet access is available. Beneficially, security, for example via encryption, is provided so that only authorized personnel are able to access the system 300, for example for viewing its system map, alarm window and system tree to view valve 20 status as well a one or more computed risk factors. The one or more software products 150 executed by the data processing arrangement 140 are operable when executed upon computing hardware to generate reports and trend plots so that the operators 40 are able to evaluate valve 20 performance and one or more risk factors associated with the one or more valves 20.

In the foregoing, it is elucidated that the data processing arrangement 140 is operable to compute one or more risk factors in relation to the valve 20 of the system 300. Computed safety factors provided in respect of the system 300 are capable of providing increased operating safety and thereby more reliable production, for example where the valve 20 associated with the system 300 is a part of a "X-mas tree" assembly for oil and/or gas industries, for example sub-sea "X-mas tree" assemblies. Computation of the one or more risk factors is capable of reducing "down" time and therefore providing enhanced profitability. The invention is thus concerned with an instrumentation system 300 which is operable to monitor continuously one or more risk factors associated with a valve 20, for example implemented as a wing-valve, for example for oil and/or gas platform operators.

The one or more risk factors are susceptible to being computed in different ways, but beneficially follow a general from as defined in Equation 1 (Eq. 1):

$$R = F(S, p_{1 \ldots n}) \qquad \text{Eq. 1}$$

wherein
R=one or more risk factors;
F=a mathematical function;
S=a strain gauge measurement; and
p=one or more pressure measurements from pressure sensor 1 to n associated with the valve 20.

An example of the function F will now be elucidated for illustrating a specific manner of implementing the present invention, although alternative manners of computing the one or more risk factors are within the scope of the present invention. As elucidated in the foregoing, the function F is optionally based upon a parametric simulation model of the valve 20.

In a first step of the computation of the risk factor R, a closing force $C_f$ is computed pursuant to Equation 2 (Eq. 2):

$$C_f = S_f + B_f \qquad \text{Eq. 2}$$

wherein
$B_f$=a "blow out" force for the element 310 of the valve 20;
$S_f$=a spring force associated with the element 310 of the valve 20.

In a second step of the computation of the risk factor R, an opposing force $O_f$ from the actuator 420 is computed pursuant to Equation 3 (Eq. 3):

$$O_f = H_p \times A_p \qquad \text{Eq. 3}$$

wherein
$H_p$=a hydraulic pressure applied to a piston of the actuator 420; and
$A_p$=an area of the piston subjected to the hydraulic pressure $H_p$.

In a third step of the computation of the risk factor R, a friction M of the element 310 of the valve 20 is computed pursuant to Equation 4 (Eq. 4):

$$M = C_f - O_f \qquad \text{Eq. 4}$$

In a fourth step of the computation of the risk factor R, a computation pursuant to Equation 5 (Eq. 5) is executed:

$$R = k \times \frac{C_f}{M} \qquad \text{Eq. 5}$$

wherein
k=scaling coefficient.

Although the present invention is described in the foregoing in respect of wing and master valves 20, namely including the element 310 arranged to perform a translation movement rather than a rotational movement to control a flow of fluid through the valve 20, the invention can be extended to pertain to ESD/ESV valves. Beneficially, the computation of the risk factor R pursuant to Equation 1 (Eq. 1) takes into account a temperature T of the valve 20, and also flow properties Q of the valve 20, namely pursuant to Equation 6 (Eq. 6):

$$R = F(S, p_1 \ldots _n, T, Q) \qquad \text{Eq. 6}$$

The valve 20 is beneficially furnished with a temperature sensor for providing in operation a measure of temperature of the valve 20, the measure being used for use when risk factors are being calculated for the valve 20.

By the operators 40 monitoring the one or more risk factors R, appropriate safety, repair and/or maintenance routine are beneficially implemented, therefore avoiding potential accident or unreliability. When the valve 20 is a critical component in an installation, the present invention is capable of potentially avoiding major incidents and disasters which can be highly expensing to rectify retrospectively. Thus, the present invention is capable of providing considerable operating benefits at installations.

Optionally, the aforementioned valves 20 are either of a rotary actuated type or a linear displacement actuated type as aforementioned. Although embodiments of the invention are described in respect of valves coupled to fluid-actuated actuators, the invention is susceptible to being applied to electrically-powered actuators wherein current and voltage energization to the electrically-powered actuators are monitored for purposes of computing the one or more risk factors (R). Optionally, actuating fluid of the actuators 420 are provided via electrically-energized fluid-control solenoid valves, wherein the solenoid valves are also provided with sensors, for example current sensors and armature movement sensors, for detecting that the solenoid valves are also working reliably and for computing one or more risk factors associated therewith. Failure of the solenoid valve feeding the actuator 420 can, from a system point of view, be a disastrous as failure of the actuator 420 itself. For example, when assessing a risk factor R associated with the solenoid, an actuating speed and actuating electrical current required to operate the solenoid is monitored.

Figure 4:
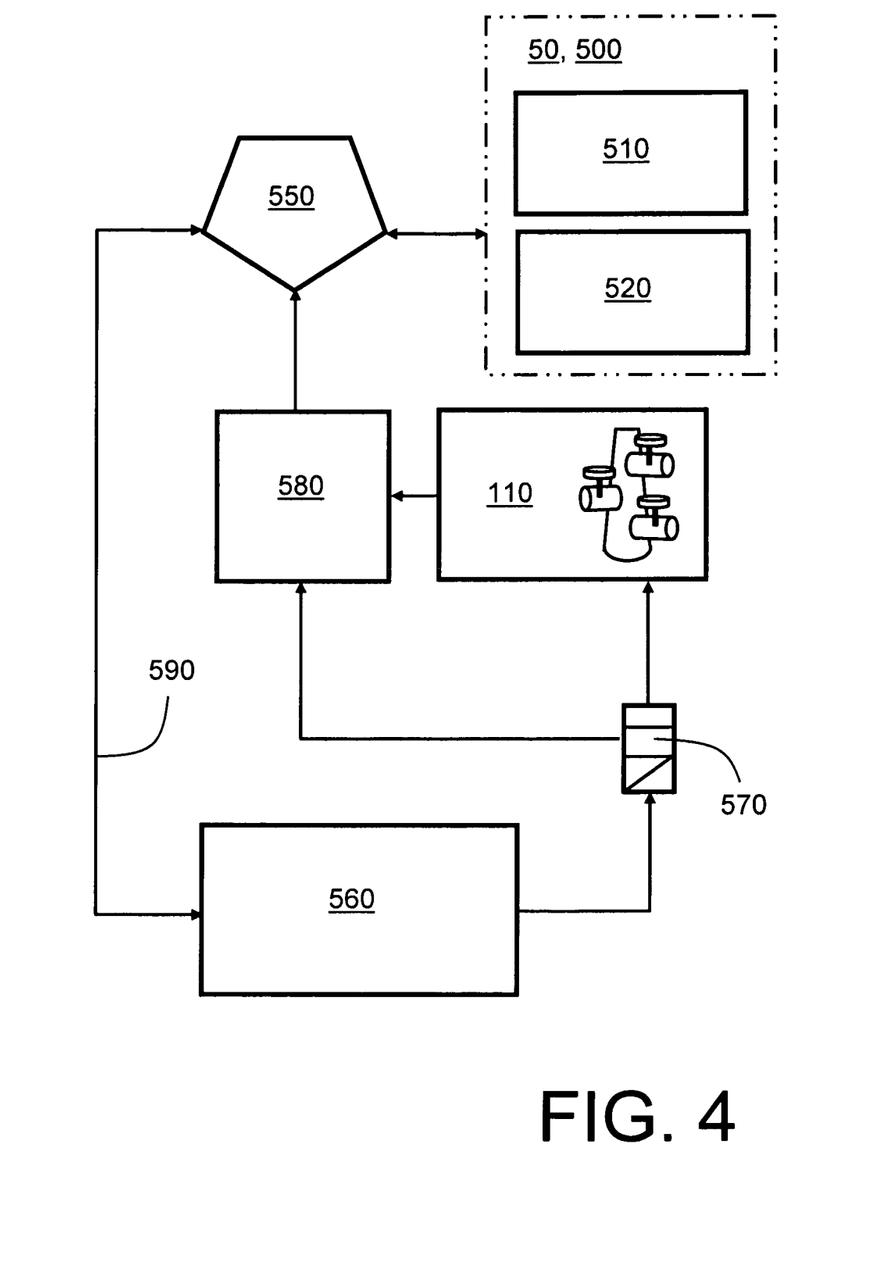
FIG. 4 is an alternative illustration of an instrumentation system pursuant to the present invention.

Referring to FIG. 4, there is shown a representation of instrumentation system pursuant to the present invention. The assembly 110 is shown including one or more valves 20 which are operated by one or more solenoids 570. From the assembly 110, sensors 120, 330, 340, 380 provide valve 20 sensor data 580 which is provided to a proprietary "safety factor" system 550 which is operable to perform data processing on the sensor data 580. Processed data from the system 550 is conveyed to a SAS control system 560 via a data tunneler 590. Outputs from the SAS control system 560 are employed to control the aforesaid one or more solenoids 570. As aforementioned, operation of the solenoid 570 is beneficially is also beneficially monitored to contribute relevant data to the sensor data 580.

The present invention is especially suitable for a Topside Christmas tree system, either sub-sea based or land-based. However, as elucidated in the foregoing, the present invention is susceptible to being employed in other types of systems.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:
1. A system, comprising:
an Xmastree in one of an oil and gas production assembly, the Xmastree comprising a valve, the valve comprising:
 an adjustable flow controlling element;
 an actuator for actuating said flow controlling element; and
 at least one sensor for generating an opposing signal, the opposing force signal representing the force required for the actuator to actuate the adjustable flow controlling element;
a fluid supply tube for supplying actuating fluid to the actuator, wherein the at least one sensor comprises a pair of static pressure sensors measuring static pressures within the fluid supply tube on either side of the actuator, wherein the pair of static pressure sensors measure a hydraulic pressure, $H_p$, applied to a piston of the actuator; and
a data processing arrangement communicatively coupled to the at least one sensor, wherein the data processing arrangement receives:
 the opposing force signal; and
 values representing physical characteristics of the valve, and wherein the data processing arrangement generates a control signal to trigger at least one automatic emergency procedure when a risk factor calculated as a function of the opposing force signal and the values exceeds a threshold value, wherein:
the values representing physical characteristics of the valve comprise:
 an area, $A_p$, of the piston of the actuator subjected to $H_p$; and
 a closing force, $C_f$, for the adjustable flow controlling element; and
the data processing arrangement calculates:
 the opposing force, $O_f$, as the product of $H_p$ and an area, $A_p$, of the piston of the actuator subjected to $H_p$; and
 the risk factor, R, pursuant to the following equation:

$$R = \frac{C_f}{C_f - O_f}.$$

2. The system of claim 1, further comprising:
a tube component for conducting a fluid through the adjustable flow controlling element of the valve; and
a pair of dynamic pressure sensors, located within the tube component on either side of the adjustable flow controlling element, the pair of dynamic pressure sensors capable of capturing a dynamic pressure difference value across the adjustable flow controlling element, and wherein computing the risk factors further comprises indicates monitoring internal seat leaks, based on the dynamic pressure difference value.

3. The system of claim 1, further comprising
a tube component for conducting a fluid through the adjustable flow controlling element of the valve;
a pair of acoustic sensors, located within the tube component on either side of the adjustable flow controlling element, the acoustic sensors capable of capturing informative indicative of internal seal seat leaks in each valve during operation.

4. The system of claim 1, wherein the control signal generated by the data processing arrangement comprises a signal to one of (i) trigger an emergency safety procedure and (ii) trigger a maintenance procedure.

5. A method for operating a valve of an Xmastree assembly, the method comprising:
receiving, at a data processing arrangement, a sensor signal that represents a hydraulic pressure, $H_p$, required for an actuator of the valve to actuate an adjustable flow controlling element of the valve, wherein the sensor signal is generated by a pair of static pressure sensors located within a fluid supply type that supplies actuating fluid to an actuator of the valve;
receiving, at the data processing arrangement, values representing physical characteristics of the valve, wherein the values representing physical characteristics of the valve comprise:
an area, $A_p$, of the piston of the actuator subjected to $H_p$; and
a closing force, $C_f$, for the adjustable flow controlling element;
calculating, at the data processing arrangement, at least one risk factor as a function of the sensor signal and the values representing physical characteristics of the valve; and
triggering, with the data processing arrangement, at least one automatic emergency procedure when the risk factor exceeds a threshold value.

6. The method of claim 5, further comprising:
dynamically adjusting the threshold value to account for an age of the valve.

7. The method of claim 6, further comprising:
dynamically adjusting the threshold value to account for a changing physical characteristics of the valve.

8. The method of claim 7, wherein the changing physical characteristics of the valve comprise corrosion of at least one valve element.

9. The method of claim 8, further comprising:
estimating corrosion of the at least one valve element as a function of a change of the sensor signal over time.

10. The method of claim 5, further comprising:
dynamically adjusting the threshold value in response to controlling a flow of a different type of fluid through the valve.

* * * * *